United States Patent
Wang et al.

(10) Patent No.: US 10,506,164 B2
(45) Date of Patent: Dec. 10, 2019

(54) DEPTH INFORMATION OBTAINING METHOD AND APPARATUS, AND IMAGE ACQUISITION DEVICE

(71) Applicant: HUAWEI TECHNOLOGIES CO., LTD., Shenzhen (CN)

(72) Inventors: Jun Wang, Shanghai (CN); Rongyue Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/069,523

(22) PCT Filed: Jan. 12, 2016

(86) PCT No.: PCT/CN2016/070707
§ 371 (c)(1),
(2) Date: Jul. 12, 2018

(87) PCT Pub. No.: WO2017/120771
PCT Pub. Date: Jul. 20, 2017

(65) Prior Publication Data
US 2019/0028646 A1    Jan. 24, 2019

(51) Int. Cl.
*H04N 5/232*    (2006.01)
*H04N 5/225*    (2006.01)
(Continued)

(52) U.S. Cl.
CPC .......... *H04N 5/23287* (2013.01); *G06T 7/55* (2017.01); *G06T 7/593* (2017.01); *G06T 7/85* (2017.01);
(Continued)

(58) Field of Classification Search
CPC ............ H04N 5/23287; H04N 13/239; H04N 13/243; H04N 5/23212; H04N 5/2258; H04N 17/002; G06T 7/55; G06T 7/593; G06T 7/85
USPC ................ 348/335, 340, 345, 348, 350, 352
See application file for complete search history.

(56) References Cited

U.S. PATENT DOCUMENTS

2008/0002959 A1 *   1/2008   Border ............... H04N 5/23212
                                                  396/111
2011/0261166 A1    10/2011   Olazaran
(Continued)

FOREIGN PATENT DOCUMENTS

| CN | 103246130 A | 8/2013 |
| CN | 103329548 A | 9/2013 |

(Continued)

*Primary Examiner* — Yogesh K Aggarwal
(74) *Attorney, Agent, or Firm* — Kilpatrick Townsend & Stockton LLP

(57) ABSTRACT

An image acquisition device includes a first camera and a second camera. When detecting that shaking occurs, the depth information obtaining apparatus may obtain images captured by the first camera and the second camera, detect an initial distance between a target shooting object in the two images, correct the initial distance by using an offset difference between a first image and a second image, and determine a depth of the target shooting object by using the corrected initial distance. In the embodiments of the present invention, the two cameras may both have an OIS function, or either of the cameras has an OIS function. When performing OIS, the depth information obtaining apparatus corrects the distance between the same shooting object in the images obtained by the two cameras, so that finally obtained depth information is relatively accurate.

12 Claims, 8 Drawing Sheets

(51) Int. Cl.
    *H04N 17/00*     (2006.01)
    *H04N 13/243*     (2018.01)
    *H04N 13/239*     (2018.01)
    *G06T 7/80*     (2017.01)
    *G06T 7/593*     (2017.01)
    *G06T 7/55*     (2017.01)

(52) U.S. Cl.
    CPC ....... *H04N 5/2258* (2013.01); *H04N 5/23212* (2013.01); *H04N 13/239* (2018.05); *H04N 13/243* (2018.05); *H04N 17/002* (2013.01)

(56) References Cited

U.S. PATENT DOCUMENTS

| | | |
|---|---|---|
| 2011/0298917 A1 | 12/2011 | Yanagita |
| 2012/0194729 A1* | 8/2012 | Zahniser ............ H04N 5/23212 348/345 |
| 2013/0135439 A1 | 5/2013 | Kakuko et al. |
| 2013/0162777 A1* | 6/2013 | Wu .......................... G03B 5/00 348/46 |
| 2013/0162784 A1 | 6/2013 | Ueda et al. |
| 2013/0242059 A1 | 9/2013 | Dahi et al. |
| 2013/0258044 A1 | 10/2013 | Betts-Lacroix |
| 2015/0022669 A1 | 1/2015 | Hall |
| 2015/0288861 A1 | 10/2015 | Duparré |

FOREIGN PATENT DOCUMENTS

| | | |
|---|---|---|
| CN | 104093014 A | 10/2014 |
| CN | 104469086 A | 3/2015 |
| CN | 104811688 A | 7/2015 |
| JP | 2012070389 A | 4/2012 |

\* cited by examiner

DEPTH INFORMATION OBTAINING METHOD AND APPARATUS, AND IMAGE ACQUISITION DEVICE

CROSS-REFERENCE TO RELATED APPLICATIONS

This application is a national stage of International Application No. PCT/CN2016/070707, filed on Jan. 12, 2016, which is hereby incorporated by reference in its entirety.

TECHNICAL FIELD

Embodiments of the present invention relate to the field of electronic technologies, and specifically, to a depth information obtaining method and apparatus, and an image acquisition device.

BACKGROUND

In the field of electronic technologies, depth information is related information of a perpendicular distance between a lens (Lens) of a camera module in an image acquisition device and a shooting object. After obtaining the depth information, the camera module may control movement of the lens according to the depth information, to implement focusing on the shooting object. Therefore, focusing accuracy depends on depth information obtaining accuracy. Optical image stabilization (Optical Image Stabilization, OIS) is a technology in which a special lens is used in cooperation with a photosensitive element to minimize image unstabilization caused by a shake of an operator during a using process. OIS is mainly implemented by moving a lens.

At present, people have stricter requirements on quality of an image captured by a camera. To obtain higher image quality, multiple camera modules are used. When an image acquisition device performs shooting by using multiple camera modules, images captured by all the camera modules are finally fused into one image. This can improve image shooting quality. In the prior art, focal lengths of lenses of all the camera modules in the image acquisition device with the multiple camera modules are slightly different. Therefore, when the image acquisition device performs OIS, a same shake may result in different offsets of the lenses in the camera modules. Consequently, depth information finally obtained by the image acquisition device is inaccurate, and the image acquisition device has relatively low accuracy and a relatively low speed during a focusing process.

SUMMARY

Embodiments of the present invention disclose a depth information obtaining method and apparatus, and an image acquisition device, so that depth information may be obtained accurately when multiple camera modules perform OIS, thereby implementing focusing accurately and quickly.

A first aspect of the embodiments of the present invention discloses a depth information obtaining method, applied to an image acquisition device, where the image acquisition device includes a first camera and a second camera, and the method may include:

when detecting that the first camera and the second camera shake, obtaining, by the depth information obtaining apparatus, a first image of a target shooting object captured by the first camera and a second image of the target shooting object captured by the second camera, where the first camera and the second camera perform image acquisition at the same time; detecting an initial distance between the target shooting object in the first image and the target shooting object in the second image, and determining an offset difference between the first image and the second image; correcting the initial distance by using the offset difference; and finally determining a depth of the target shooting object according to the corrected initial distance.

It can be learned that, if both the first camera and the second camera have an OIS function, or either of the cameras has an OIS function, when performing OIS, the depth information obtaining apparatus corrects the distance between the same shooting object in the two images respectively obtained by the two cameras, so that the image acquisition device finally obtains a relatively accurate depth of the object. This improves focusing accuracy of the cameras.

Optionally, the first camera includes a first lens, and the second camera includes a second lens. A specific manner of determining the offset difference between the first image and the second image by the depth information obtaining apparatus may be: when it is detected that the first camera and the second camera shake, obtaining a first offset of the first lens and a second offset of the second lens by using Hall effect sensors in the cameras, determining an offset value of the first image and an offset value of the second image respectively according to the first offset and the second offset, and finally obtaining an offset difference between the offset value of the first image and the offset value of the second image. In actual application, an offset of a lens is not an actual offset of an image. An actual offset value of an image when shaking occurs is determined according to a relationship between an offset of a lens and an offset of the image. In this way, the finally obtained depth of the target shooting object can be more accurate.

Optionally, the image acquisition device is a dual-camera image acquisition device.

Optionally, in the image acquisition device, if the two cameras both have the OIS function, neither the offset value of the first image nor the offset value of the second image is 0 when shaking occurs. If only one camera of the two cameras has the OIS function, it may be considered that an offset value of an image captured by a camera with no OIS function when shaking occurs is 0.

Optionally, when the image acquisition device includes three or more cameras, the depth information obtaining apparatus can also similarly obtain the depth of the target shooting object in the foregoing manner, and finally an average depth may be calculated and used as an actual depth of the target shooting object. For multiple cameras, when performing OIS, there are larger differences between depths obtained by all the cameras. Therefore, the depth of the target shooting object obtained in this manner is more accurate, so that focusing can be accurately and quickly implemented during a focusing process.

Optionally, the initial distance may be a relative distance between the target shooting object in the first image and the target shooting object in the second image, and the offset difference should be a relative difference between the offset value of the first image and the offset value of the second image. That is, both the initial distance and the offset difference are vectors, and a manner of calculating the offset difference needs to be corresponding to a manner of calculating the initial distance.

Optionally, after determining the depth of the target shooting object according to the corrected initial distance, when receiving an instruction for focusing on the target shooting object, in response to the focusing instruction, the depth information obtaining apparatus may further obtain a first moving distance that is of the first lens and that is corresponding to the depth, obtain a second moving distance that is of the second lens and that is corresponding to the depth, then determine a focus location of the first lens according to the first moving distance, determine a focus location of the second lens according to the second moving distance, and finally control the first lens and the second lens to move to respective focus locations.

It can be learned that, after obtaining the depth of the target shooting object, when needing to perform focusing on the target shooting object, the depth information obtaining apparatus may obtain distances for which the lenses need to move and that are corresponding to the depth, determine focus locations of the lenses according to respective moving distances, and then move the lenses to the respective focus locations. This can accurately and quickly implement focusing on the target shooting object.

A second aspect of the embodiments of the present invention discloses a depth information obtaining apparatus, applied to an image acquisition device. The image acquisition device includes a first camera and a second camera. The depth information obtaining apparatus may include an obtaining unit, a detection unit, a first determining unit, a correction unit, and a second determining unit. When it is detected that the first camera and the second camera shake, the obtaining unit obtains a first image of a target shooting object captured by the first camera and a second image of the target shooting object captured by the second camera, where the first camera and the second camera perform image acquisition at the same time, so that the detection unit detects an initial distance between the target shooting object in the first image and the target shooting object in the second image. In addition, the first determining unit determines an offset difference between the first image and the second image. Then, the correction unit corrects the initial distance by using the offset difference, and the second determining unit determines a depth of the target shooting object according to the corrected initial distance.

It can be learned that, if both the first camera and the second camera have an OIS function, or either of the cameras has an OIS function, when performing OIS, the depth information obtaining apparatus corrects the distance between the same shooting object in the two images respectively obtained by the two cameras, so that the image acquisition device finally obtains a relatively accurate depth of the object. This improves focusing accuracy of the cameras.

Optionally, the first camera includes a first lens, and the second camera includes a second lens. The first determining unit may include an obtaining subunit and a determining subunit.

When the depth information obtaining apparatus detects that the first camera and the second camera shake, the obtaining subunit may obtain a first offset of the first lens and a second offset of the second lens by using Hall effect sensors in the cameras. The determining subunit may determine an offset value of the first image and an offset value of the second image respectively according to the first offset and the second offset, and finally obtain an offset difference between the offset value of the first image and the offset value of the second image.

In actual application, an offset of a lens is not an actual offset of an image. An actual offset value of an image when shaking occurs is determined according to a relationship between an offset of a lens and an offset of the image. In this way, the finally obtained depth of the target shooting object can be more accurate.

Optionally, the depth information obtaining apparatus may further include a receiving unit and a control unit.

When the receiving unit receives an instruction for focusing on the target shooting object, the obtaining unit may be triggered to respond to the focusing instruction, to obtain a first moving distance that is of the first lens and that is corresponding to the depth, and obtain a second moving distance that is of the second lens and that is corresponding to the depth. The second determining unit determines a focus location of the first lens according to the first moving distance, and determines a focus location of the second lens according to the second moving distance. Finally, the control unit controls the first lens and the second lens to move to respective focus locations.

It can be learned that, after obtaining the depth of the target shooting object, when needing to perform focusing on the target shooting object, the depth information obtaining apparatus may obtain distances for which the lenses need to move and that are corresponding to the depth, determine focus locations of the lenses according to respective moving distances, and then move the lenses to the respective focus locations. This can accurately and quickly implement focusing on the target shooting object.

A third aspect of the embodiments of the present invention discloses an image acquisition device, including a first camera, a second camera, a processor, and a receiver. The first camera is configured to: when the image acquisition device detects that the first camera and the second camera shake, capture a first image of a target shooting object. The second camera is configured to: when the image acquisition device detects that the first camera and the second camera shake, capture a second image of the target shooting object, where the first camera and the second camera perform image acquisition at the same time. The processor is mainly configured to perform operations that are performed by the obtaining unit, the detection unit, the correction unit, the determining units, and the control unit of the foregoing depth information obtaining apparatus. The receiver is mainly configured to receive an instruction for focusing on the target shooting object, and the processor can respond to the focusing instruction to implement focusing on the target shooting object.

Implementation of the embodiments of the present invention brings the following beneficial effects:

In the embodiments of the present invention, when detecting that the cameras shake, the depth information obtaining apparatus may obtain the images captured by the first camera and the second camera, detect the initial distance between the target shooting object in the two images, correct the initial distance by using the offset difference between the first image and the second image, and finally substitute the corrected initial distance into a depth calculation formula, to determine the depth of the target shooting object. According to the embodiments of the present invention, when the two cameras may both have an OIS function, or either of the cameras has an OIS function, the depth information obtaining apparatus may correct the distance between the same shooting object in the images obtained by the two cameras, so that depth information, finally obtained according to the corrected distance, of the shooting object is relatively accurate. This can accurately and quickly implement focusing on the shooting object.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention disclose a depth information obtaining method and apparatus, and an image acquisition device, so that depth information may be obtained accurately when multiple camera modules perform OIS, thereby implementing focusing accurately and quickly. The following separately provides detailed descriptions.

Figure 1:
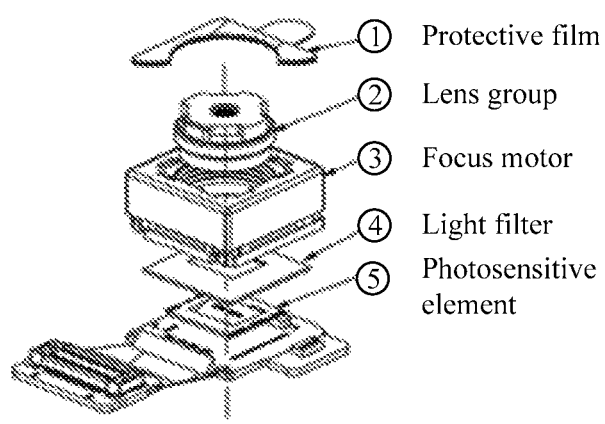
FIG. 1 is a schematic structural diagram of a camera module according to an embodiment of the present invention.

To better understand the depth information obtaining method and apparatus, and an image acquisition device according to the embodiments of the present invention, a structure of a camera module applicable to the embodiments of the present invention is first described in the following. Referring to FIG. 1, FIG. 1 is a schematic structural diagram of a camera module according to an embodiment of the present invention. In the structure shown in FIG. 1, the camera module includes: ① a protective film, ② a lens group, ③ a focus motor, ④ a light filter, and ⑤ a photosensitive element. The protective film ① is configured to protect the lens group. The lens group ② generally includes multiple lenses, and has an imaging function. Generally, the lens group has an OIS function. When shaking occurs, a relatively clear image may be obtained by moving the lens (collectively referred to as a lens in the embodiments of the present invention, and also referred to as the lens) of the lens group left and right. The focus motor ③ is mainly configured to drive the lens to move for focus assist. The light filter ④ is mainly configured to filter infrared rays, making a finally displayed image have a relatively small color difference. The photosensitive element ⑤ is mainly configured to convert an image obtained by the lens group ② into an electronic image. A location of the photosensitive element is fixed. For an image acquisition device with multiple camera modules, it may be considered that photosensitive elements corresponding to all cameras are on a same plane. The camera module shown in FIG. 1 may be applied to an image acquisition device with photographing and shooting functions, such as a smartphone, a tablet computer, a personal digital assistant (Personal Digital Assistant, PDA), a mobile Internet device (Mobile Internet Device, MID), and a digital camera. When the image acquisition device includes multiple camera modules, the multiple camera modules are arranged side by side in the image acquisition device. In addition, the multiple camera modules may all have the OIS function, or only one camera has the OIS function. This is not limited in this embodiment of the present invention.

According to the camera module shown in FIG. 1, after capturing an image, the image acquisition device may calculate depth information of each shooting object in the image. When focusing needs to be performed on a shooting object, the image acquisition device may perform focusing on the shooting object according to a depth of the shooting object. When the image acquisition device includes the multiple camera modules, images captured by the multiple camera modules are finally fused into one image, so that the captured image is more clear, and can better satisfy a shooting requirement of a user. It should be noted that this solution is proposed on a basis that multiple cameras perform OIS.

Figure 2:
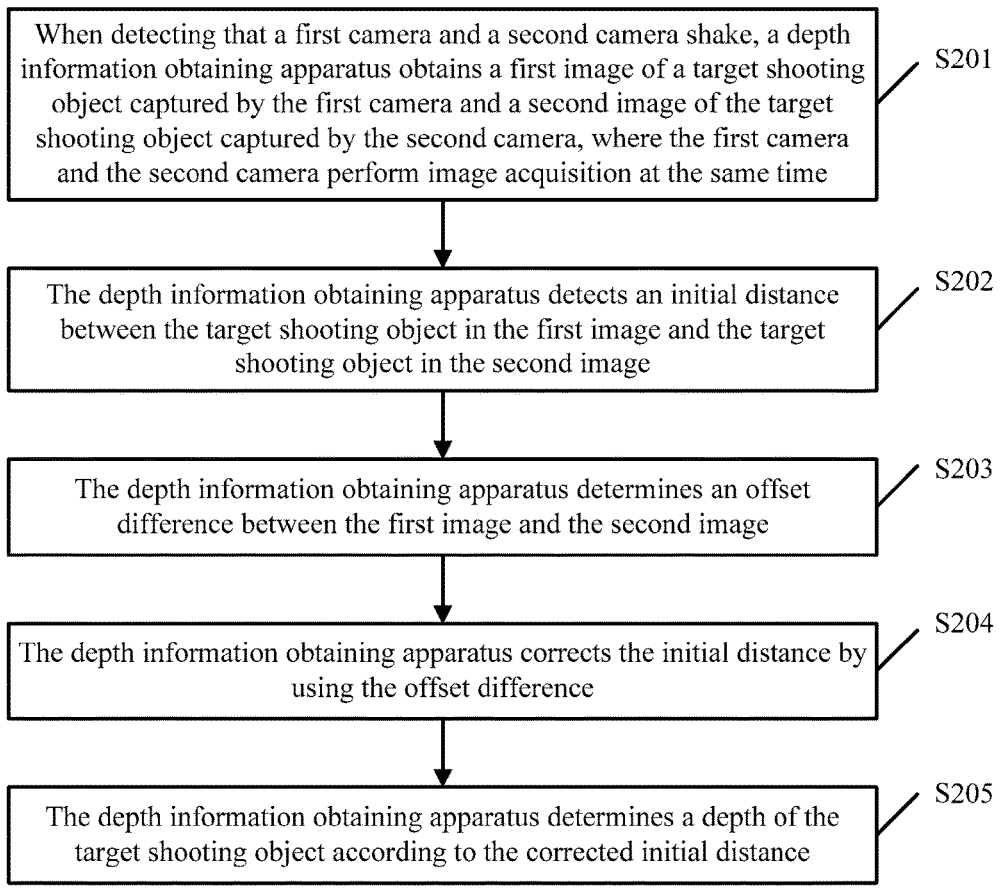
FIG. 2 is a schematic flowchart of a depth information obtaining method according to an embodiment of the present invention.

Based on the camera module shown in FIG. 1, an embodiment of the present invention discloses a depth information obtaining method. Referring to FIG. 2, FIG. 2 is a schematic flowchart of the depth information obtaining method according to this embodiment of the present invention. The method shown in FIG. 2 may be applied to an image acquisition device. The image acquisition device includes a first camera and a second camera. As shown in FIG. 2, the depth information obtaining method may include the following steps.

S201. When detecting that the first camera and the second camera shake, a depth information obtaining apparatus obtains a first image of a target shooting object captured by the first camera and a second image of the target shooting object captured by the second camera, where the first camera and the second camera perform image acquisition at the same time.

In this embodiment of the present invention, when the image acquisition device enters an image preview screen, the first camera and the second camera capture images in respective fields of view in real time. Generally, the first camera and the second camera shake at the same time. Therefore, when the depth information obtaining apparatus detects that the first camera and the second camera shake (specifically, a gyroscope may be used to detect whether shaking occurs), the first camera and the second camera capture images from a current environment at the same time, and obtain a first image of the first camera and a second image of the second camera respectively, so that the depth information obtaining apparatus obtains the first image and the second image. Both the first image and the second image include a target shooting object. The first image and the second image are electronic images obtained by converting, by photosensitive elements of the first camera and the second camera, images obtained by lenses of the cameras. The target shooting object is any shooting object existing in both the first image and the second image, such as a human face, a building, or an animal. This is not limited in this embodiment of the present invention.

In this embodiment of the present invention, the first camera includes a first lens, and the second camera includes a second lens. When detecting that the first camera and the second camera shake, in addition to the first image and the second image, the depth information obtaining apparatus obtains a moving distance af_offset$_1$ of the first lens and a moving distance af_offset$_2$ of the second lens.

Specifically, af_offset$_1$ is a scalar distance between a current location of the first lens and a first start location of the first lens on a Z-axis of a three-dimensional coordinate system, that is, a relative moving distance between the current location at which the first lens captures the first image and the first start location of the first lens. af_offset$_2$ is a scalar distance between a current location of the second lens and a second start location of the second lens on the Z-axis of the three-dimensional coordinate system, that is, a relative moving distance between the current location at which the second lens captures the second image and the second start location of the second lens. The first start location is mainly a location, of the first lens, at which a perpendicular distance between the first lens and the photosensitive element of the first camera is one times a focal length of the first lens. The second start location is mainly a location, of the second lens, at which a perpendicular distance between the second lens and the photosensitive element of the second camera is one times a focal length of the second lens. A minimum distance between the first lens and the photosensitive element of the first camera is generally a distance of one times the focal length of the first lens. A minimum distance between the second camera and the photosensitive element of the second lens is similarly a distance of one times the focal length of the second lens.

S202. The depth information obtaining apparatus detects an initial distance between the target shooting object in the first image and the target shooting object in the second image.

Figure 3:
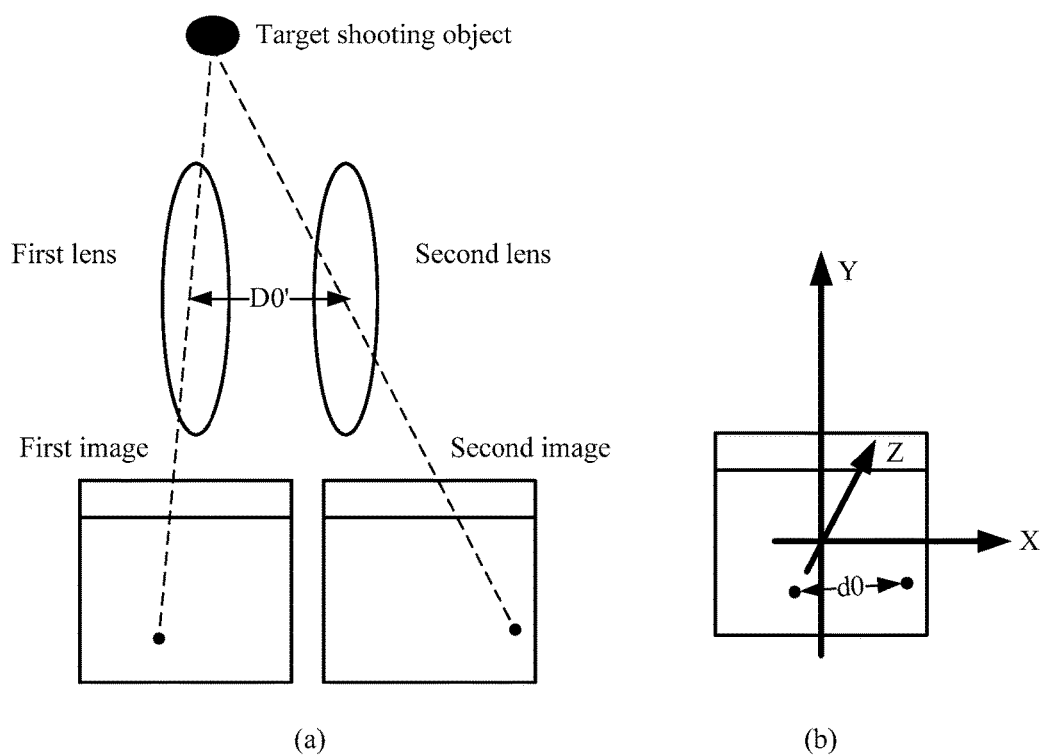
FIG. 3 is a schematic diagram of a dual-camera shooting scenario according to an embodiment of the present invention.

Also referring to FIG. 3, FIG. 3 is a schematic diagram of a dual-camera shooting scenario according to an embodiment of the present invention. In FIG. 3, the depth information obtaining apparatus may create a three-dimensional coordinate system by using a plane on which the photosensitive elements of the cameras are located as an XY-plane and using a direction along which the lenses of the cameras are perpendicular to the photosensitive elements as a Z-axis. A location of an origin of the three-dimensional coordinate system is not limited in this embodiment of the present invention. Therefore, when obtaining the first image captured by the first lens and the second image captured by the second lens (as shown in FIG. (a) of FIG. 3), the depth information obtaining apparatus may make the first image and the second image overlapped and mapped on the XY-plane of the three-dimensional coordinate system (as shown in FIG. (b) of FIG. 3).

Further, when the target shooting object exists in both the first image and the second image, the depth information obtaining apparatus may detect the initial distance between the target shooting object in the first image and the target shooting object in the second image. The initial distance is generally a vector distance and is represented by d0. Specifically, the initial distance is specifically a coordinate distance, obtained by the depth information obtaining apparatus after the depth information obtaining apparatus makes the first image and the second image overlapped and mapped onto the XY-plane, between the target shooting object in the two images (that is, a distance d0 between two black spots in the first image and the second image shown in FIG. (b) of FIG. 3).

Specifically, the initial distance $d_0$ may be a vector distance, obtained by the depth information obtaining apparatus after the depth information obtaining apparatus makes the two images overlapped and mapped onto the XY-plane of the three-dimensional coordinate system, between coordinates of a same characteristic pixel of the target shooting object in the two images. Alternatively, the initial distance $d_0$ may be a distance obtained as follows: On the XY-plane, the depth information obtaining apparatus selects multiple characteristic pixels from the first image; for each of the characteristic pixels, selects, from the second image, a pixel with a same characteristic as the characteristic pixel; calculates a vector distance between coordinates of the two pixels; and finally uses an average value of vector distances of multiple groups of pixels with same characteristics as the initial distance $d_0$ between the target shooting object in the first image and the target shooting object in the second image. This is not limited in this embodiment of the present invention.

In this embodiment of the present invention, a specific manner of detecting the initial distance between the target shooting object in the first image and the target shooting object in the second image by the depth information obtaining apparatus may be:

detecting the initial distance $d_0$ between the target shooting object in the first image and the target shooting object in the second image that are mapped on the XY-plane of the three-dimensional coordinate system. On the XY-plane of the three-dimensional coordinate system created in FIG. 3, the depth information obtaining apparatus may first make the first image and the second image overlap with each other; select a characteristic pixel $P_1$ from the target shooting object in the first image, with coordinates, say $(P_{1x}, P_{1y})$; and select, from the target shooting object in the second image, a pixel $P_2$ with a same characteristic as the characteristic pixel, with coordinates, say $(P_{2x}, P_{2y})$. In this way, the depth information obtaining apparatus may calculate, according to the coordinates of $P_1$ and $P_2$, the initial vector distance $d_0$, say $(d_{0x}, d_{0y})$, of the two pixels. $d_{0x}$ may be $P_{1x}-P_{2x}$ or $P_{2x}-P_{1x}$. When $d_{0x}=P_{1x}-P_{2x}$, $d_{0y}=P_{1y}-P_{2y}$; or when $d_{0x}=P_{2x}-P_{1x}$, $d_{0y}=P_{2y}-P_{1y}$. This is not limited in this embodiment of the present invention.

Optionally, the depth information obtaining apparatus may further use a central point of the first image in the photosensitive element of the first camera to create a three-dimensional coordinate system; use a central point of the second image in the photosensitive element of the second camera to create another three-dimensional coordinate system; then separately obtain coordinates, in the two coordinate systems, of a same characteristic pixel of the target shooting object in the first image and the target shooting object in the second image; and finally calculate a vector distance between coordinates of the target shooting object in the first image and coordinates of the target shooting object in the second image. The two coordinate systems have a same unit distance and same X-, Y-, and Z-axis directions except different origins of coordinates.

It should be noted that the depth information obtaining apparatus may create a three-dimensional coordinate system for each of the two cameras, or may create only one three-dimensional coordinate system. This is not limited in this embodiment of the present invention. For ease of description, creating one three-dimensional coordinate system is used for description in this specification. Details are not further described in this embodiment of the present invention.

S203. The depth information obtaining apparatus determines an offset difference between the first image and the second image.

In this embodiment of the present invention, the offset difference between the first image and the second image can be understood as a difference between an offset value of the first image and an offset value of the second image. Specifically, after obtaining the first image and the second image, the depth information obtaining apparatus may separately determine coordinates locations of the first image and the second image on the XY-plane of the three-dimensional coordinate system; obtain a coordinates location of a third image captured by the first camera and a coordinates location of a fourth image captured by the second camera, where the coordinates locations are prerecorded when the cameras do not shake; separately calculate a relative coordinates offset, say $d_1$, between the coordinates location of the first image and the coordinates location of the third image, and a relative coordinates offset, say $d_2$, between the coordinates location of the second image and the coordinates location of the fourth image. A difference between $d_1$ and $d_2$ is the offset difference between the first image and the second image. $d_1$, $d_2$, and the offset difference all are vectors.

In actual application, the offset value $d_1$ is generally a relative vector offset between the first image and an image that is captured by the first lens at the first start location, and the offset value $d_2$ is generally a relative vector offset between the second image and an image that is captured by the second lens at the second start location.

Specifically, the depth information obtaining apparatus prerecords coordinates of an image, captured by the first lens at one times of a focal length (that is, the first start location) of the first lens, mapped on the XY-plane in the three-dimensional coordinate system (which may be specifically recording a coordinates location of each pixel in the image). When the first camera performs OIS, the first lens moves on the XY-plane of the three-dimensional coordinate system. In this case, a relative offset between the first image captured by the first camera and an image captured at the first start location may occur on the XY-plane. Assuming that coordinates of a pixel at a location in the image captured at the first start location by the first lens are $(q_{1x}, q_{1y})$, the depth information obtaining apparatus selects, from the first image, a pixel at a same location as the pixel in the image captured at the first start location, with coordinates, say $(q'_{1x}, q'_{1y})$. The depth information obtaining apparatus may obtain the offset value $d_1$ of the first image, that is, $(d_{1x}=q'_{1x}-q_{1x}, d_{1y}=q'_{1y}-q_{1y})$, by comparing the coordinates of the two pixels in the two images.

Similarly, the offset value $d_2$ of the second image may be obtained, that is, $(d_{2x}=q'_{2x}-q_{2x}, d_{2y}=q'_{2y}-q_{2y})$.

It can be understood that, if the initial distance $d_0$ is obtained by subtracting the coordinates of the characteristic pixel of the target shooting object in the second image from the coordinates of the same characteristic pixel of the target shooting object in the first image, that is, $d_0$ is $(P_{1x}-P_{2x}, P_{1y}-P_{2y})$, the offset difference is $d_1-d_2$. On the contrary, if the initial distance $d_0$ is obtained by subtracting the coordinates of the characteristic pixel of the target shooting object in the first image from the coordinates of the same characteristic pixel of the target shooting object in the second image, that is, $d_0$ is $(P_{2x}-P_{1x}, P_{2y}-P_{1y})$, the offset difference is $d_2-d_1$. This is not limited in this embodiment of the present invention. That is, a method for calculating an offset difference needs to be consistent with that for calculating do.

It should be noted that, the initial distance may be a relative vector distance between the target shooting object in the first image and the target shooting object in the second image, and the offset difference is a relative offset difference between the offset value of the first image and the offset value of the second image. Alternatively, the initial distance may be a relative vector distance between the target shooting object in the second image and the target shooting object in the first image, and the offset difference is a relative offset difference between the offset value of the second image and the offset value of the first image. This is not limited in this embodiment of the present invention.

S204. The depth information obtaining apparatus corrects the initial distance by using the offset difference.

In this embodiment of the present invention, after determining the offset difference between the first image and the second image, the depth information obtaining apparatus may correct $d_0$ by using the offset difference to obtain a corrected distance $d_0'$, that is, $(d_{0x}', d_{0y}')$. Specifically, a specific manner of correcting $d_0$ by the depth information obtaining apparatus is: $d_0' = d_0 - (d_1 - d_2)$. That is, $d_{0x}' = d_{0x} - (d_{1x} - d_{2x})$ and $d_{0y}' = d_{0y} - (d_{1y} - d_{2y})$.

S205. The depth information obtaining apparatus determines a depth of the target shooting object according to the corrected initial distance.

It should be noted that, if shaking occurs, when the cameras perform optical image stabilization, an offset occurs on the lenses on the XY-plane, and a distance between images correspondingly captured changes accordingly.

In this embodiment of the present invention, when optical image stabilization is not performed, in the images captured by the first camera and the second camera, a distance between the same shooting object in the two images exists. However, an offset does not occur on the lenses on the XY-plane in this case. Therefore, the depth, of each shooting object, obtained by means of calculation according to a depth calculation formula is accurate. However, focal lengths of the first lens and the second lens are slightly different. Therefore, when shaking occurs, either of the first camera or the second camera performs optical image stabilization, offsets of the first lens and the second lens relative to respective start locations on the XY-plane are also different. Assuming that when the first camera and the second camera separately capture an image with the target shooting object, an actual distance between the first lens and the second lens is $D_0'$ (as shown in FIG. 3). When optical image stabilization is performed, a difference between the offset of the first lens and that of the second lens on the XY-plane is relatively small, and the depth information apparatus generally cannot directly obtain the actual distance between the two lenses. Therefore, generally, in the prior art, when the depth of the shooting object is calculated, a vector distance between the first start location and the second start location is generally used as an actual vector distance between the first lens and the second lens. As a result, finally obtained depth information is not accurate, or even there is a large difference between the finally obtained depth information and actual depth information.

In this embodiment of the present invention, a focal length of a lens is generally given. Therefore, the depth information obtaining apparatus may generally directly obtain the vector distance $D_0$ between the first start location and the second start location. The vector distance $D_0$ on the XY-plane may be represented as $(D_{0x}, D_{0y})$. Therefore, the depth information obtaining apparatus may calculate the depth of the target shooting object by using the corrected distance $d_0'$ and $D_0$. In this way, the finally obtained depth information is relatively accurate.

It should be noted that $D_0$ may be obtained by subtracting coordinates of the second start location on the XY-plane from coordinates of the first start location on the XY-plane, or may be obtained by subtracting coordinates of the first start location on the XY-plane from coordinates of the second start location on the XY-plane. A method for calculating $D_0$ also needs to be consistent with that for calculating $d_0$. Details are not further described herein in this embodiment of the present invention.

In this embodiment of the present invention, after obtaining the vector distance $D_0$ between the first start location and the second start location, the corrected distance $d_0'$, af_offset$_1$, and af_offset$_2$, the depth information obtaining apparatus may calculate the depth of the target shooting object according to the depth calculation formula.

It can be understood that, when the image acquisition device with multiple camera modules performs shooting or OIS, distances between lenses of all cameras and photosensitive elements need to be equal. Therefore, the depth information obtaining apparatus may calculate an actual depth of the target shooting object according to a parameter of the first camera, or may calculate an actual depth of the target shooting object according to a parameter of the second camera. This is not limited in this embodiment of the present invention.)

That is, for the image acquisition device, $(f_1 + \text{af\_offset}_1)$ needs to remain equal to $(f_2 + \text{af\_offset}_2)$. $f_1$ is a focal length of the first lens, and $f_2$ is a focal length of the second lens. After the depth information obtaining apparatus corrects $d_0$, the finally obtained depth, represented by Depth, of the target shooting object may be $$\text{Depth} = \frac{|D_0|}{|d_0'|} * (f_1 + \text{af\_offset}_1) \text{ or Depth} = \frac{|D_0|}{|d_0'|} * (f_2 + \text{af\_offset}_2).$$

During specific implementation, after correcting the initial distance $d_0$, the depth information apparatus may use the depth calculation formula to calculate a depth of the target shooting object in the first image and a depth of the target shooting object in the second image, where $|D_0| = \sqrt{D_{0x}^2 + D_{0y}^2}$ and $|d_0'| = \sqrt{(d_{0x}')^2 + (d_{0y}')^2}$.

Optionally, if both the first camera and the second camera have the OIS function, when the image acquisition device performs OIS, offsets occur on the first lens and the second lens on the XY-plane relative to respective start locations. Therefore, neither the offset value $d_1$ of the first image nor the offset value $d_2$ of the second image is 0. If either of the first camera and the second camera has the OIS function (assuming that the first camera has the OIS function), when the image acquisition device performs OIS, an offset occurs only on the first lens on the XY-plane relative to the start location of the first lens. Therefore, the offset value $d_1$ is not 0, and the offset value $d_2$ of the second image captured by the camera with no OIS function (the second camera) is 0. That is, this solution is not only applicable to an image acquisition device of which two cameras have the OIS function, but also applicable to an image acquisition device of which only one camera has the OIS function. This is not limited in this embodiment of the present invention.

Optionally, this solution can be not only applicable to an image acquisition device that has two cameras and of which at least one of the cameras has the OIS function, but also applicable to an image acquisition device that has three or more cameras and of which at least one of the cameras has the OIS function. In an image acquisition device with multiple cameras, using an image acquisition device with three cameras as an example, the depth information obtaining apparatus may combine every two of the three cameras, and obtain depths of the target shooting object by using two cameras in each combination, to obtain three depths. Finally, the depth information obtaining apparatus may use an average depth of the three depths as an actual depth of the target shooting object. This is not limited in this embodiment of the present invention.

It can be learned that, in the method shown in FIG. 2, when detecting that the cameras shake, the depth information obtaining apparatus may obtain the images captured by the first camera and the second camera, detect the initial distance between the target shooting object in the two images, correct the initial distance by using the offset difference between the first image and the second image, and finally substitute the corrected initial distance into the depth calculation formula, to determine the depth of the target shooting object. According to this embodiment of the present invention, when the two cameras may both have an OIS function, or either of the cameras has an OIS function, the depth information obtaining apparatus may correct the distance between the same shooting object in the images obtained by the two cameras, so that depth information, finally obtained according to the corrected distance, of the shooting object is relatively accurate. This can accurately and quickly implement focusing on the shooting object.

Figure 4:
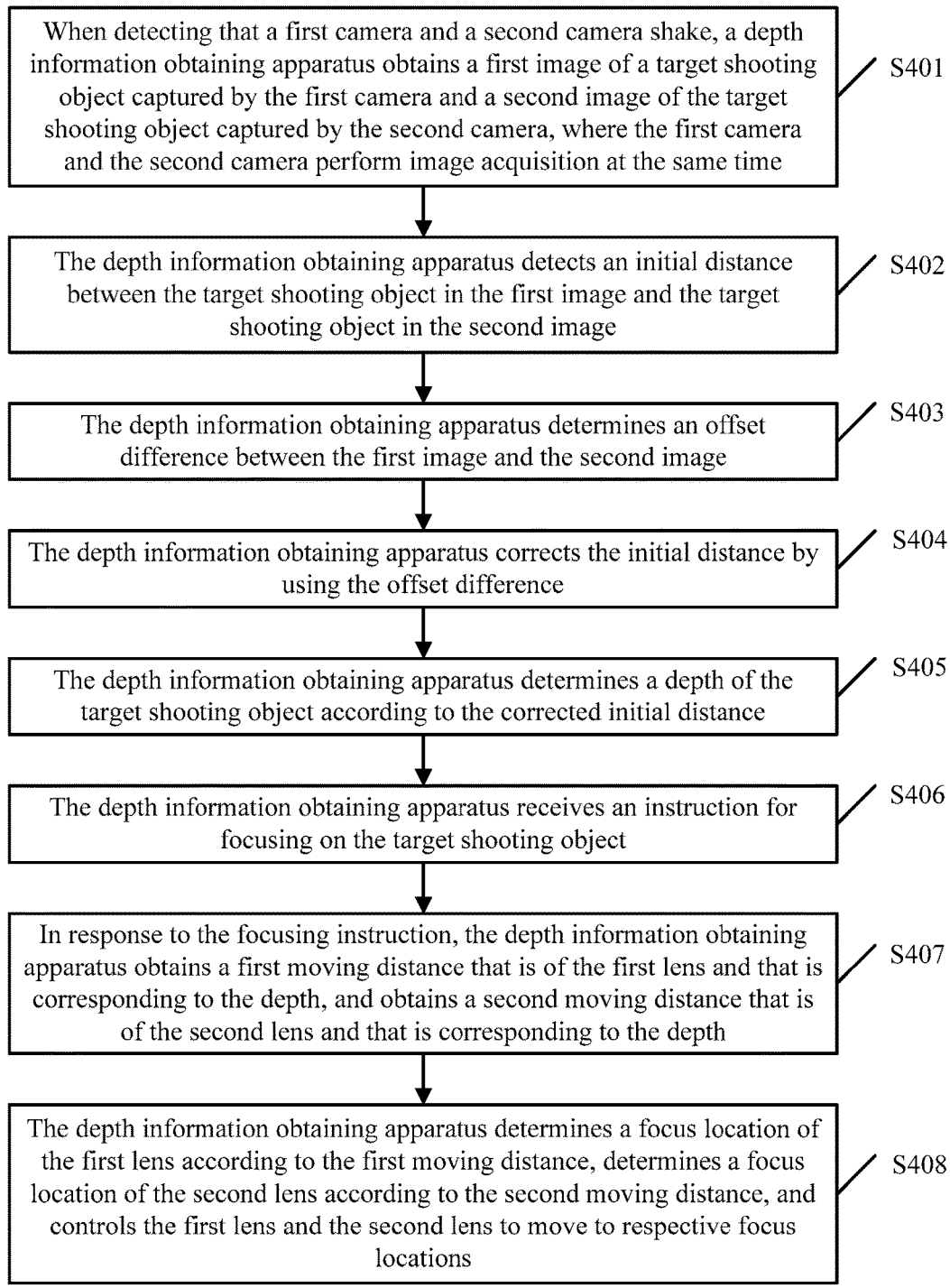
FIG. 4 is a schematic flowchart of another depth information obtaining method according to an embodiment of the present invention.

Based on the camera module shown in FIG. 1, an embodiment of the present invention discloses another depth information obtaining method. Referring to FIG. 4, FIG. 4 is a schematic flowchart of the another depth information obtaining method according to this embodiment of the present invention. The method shown in FIG. 4 may be applied to an image acquisition device. The image acquisition device includes a first camera and a second camera. As shown in FIG. 4, the depth information obtaining method may include the following steps.

S401. When detecting that the first camera and the second camera shake, a depth information obtaining apparatus obtains a first image of a target shooting object captured by the first camera and a second image of the target shooting object captured by the second camera, where the first camera and the second camera perform image acquisition at the same time.

S402. The depth information obtaining apparatus detects an initial distance between the target shooting object in the first image and the target shooting object in the second image.

S403. The depth information obtaining apparatus determines an offset difference between the first image and the second image.

In this embodiment of the present invention, a specific manner of determining the offset difference between the first image and the second image by the depth information obtaining apparatus may include the following steps.

(11) When detecting that the first camera and the second camera shake, the depth information obtaining apparatus obtains a first offset of a first lens and a second offset of a second lens.

(12) The depth information obtaining apparatus determines an offset value of the first image according to the first offset, determines an offset value of the second image according to the second offset, and obtains an offset difference between the offset value of the first image and the offset value of the second image.

During specific implementation, the first offset of the first lens may be understood as a vector offset between a current location of the first lens and a first start location on the XY-plane, where the vector offset is marked as $L_1$. The second offset of the second lens may be understood as a vector offset between a current location of the second lens and a second start location on the XY-plane, where the vector offset is marked as $L_2$.

Figure 5:
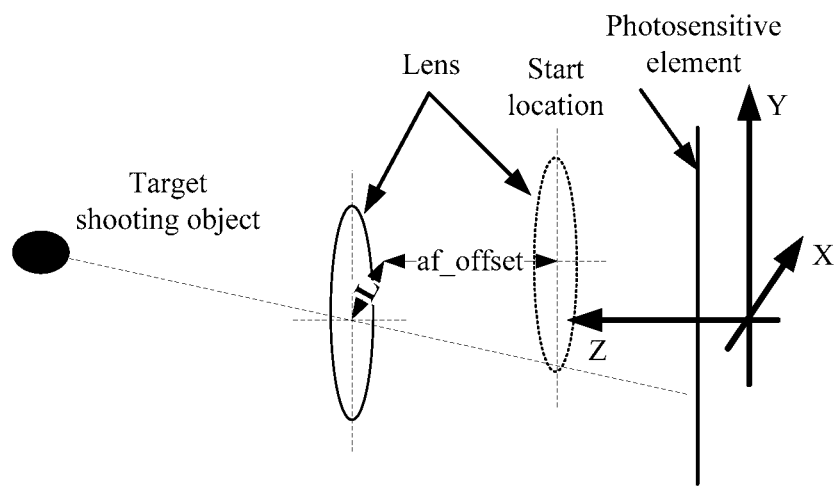
FIG. 5 is a schematic diagram of a scenario in which a lens moves when a camera performs OIS according to an embodiment of the present invention.

Also referring to FIG. 5, FIG. 5 is a schematic diagram of a scenario in which a lens moves when a camera performs OIS according to an embodiment of the present invention. As shown in FIG. 5, a location, represented by a dotted line, of a lens is a start location of the lens, and a location, represented by a solid line, of the lens is a lens location (that is, a current location of the lens) at which the lens captures an image with the target shooting object while performing OIS. In a three-dimensional coordinate system created in FIG. 5, coordinates of the start location on the XY-plane is subtracted from coordinates of the current location of the lens on the XY-plane to obtain a relative offset L between the lens and the start location, and the offset is a vector. A Z-axis coordinate of the start location is subtracted from a Z-axis coordinate of the current location of the lens to obtain a moving distance af_offset between the lens and the start location.

For example, the first lens is used as an example. The start location shown in FIG. 5 is a first start location (assuming that coordinates are $(L_{1x}, L_{1y}, L_{1z})$) of the first lens, and the current location shown in FIG. 5 is a current location (assuming that coordinates are $(L'_{1x}, L'_{1y}, L'_{1z})$) of the first lens. In this case, a moving distance af_offset$_1$ on the Z-axis between the current location of the first lens and the first start location is $|L'_{1z} - L_{1z}|$, which is a scalar distance. The first offset $L_1$ on the XY-plane between the current location of the first lens and the first start location is $(L'_{1x} - L_{1x}, L'_{1y} - L_{1y})$, which is a vector distance.

Similarly, a moving distance af_offset$_2$ of the second lens may be obtained, that is $|L'_{2z} - L_{2z}|$, and the second offset $L_2$ of the second lens may be obtained, that is $(L'_{2x} - L_{2x}, L'_{2y} - L_{2y})$.

It should be noted that both the moving distance and the offset of the lens mentioned in this specification refer to a distance between optical centers of the lens (convex lens). Details are not further described in this embodiment of the present invention.

It should be noted that the depth information obtaining apparatus records offset scales of the first lens and the second lens on the XY-plane by mainly using Hall effect sensors or lasers. In addition to recording the offset scales, offset directions may be recorded. Offsets of the lenses are obtained according to the offset directions of the lenses and distances corresponding to the scales.

In a feasible implementation, before obtaining the offsets of the first lens and the second lens, the depth information obtaining apparatus may further calibrate a Hall scale. A specific manner may be as follows:

For each camera (a focal length is given, marked as f), the depth information obtaining apparatus may control a lens of the camera to capture a table whose shooting depth is given (marked as S), controls the lens to move along a primary optical axis of the lens. First, the lens is moved one Hall scale, and the table is captured, so that a width (marked as d) of the table on a photosensitive element may be obtained. According to an imaging formula $$\frac{1}{S} + \frac{1}{s} = \frac{1}{f},$$

where s=f+af_offset and is a distance between the lens and the photosensitive element. Therefore, a value of af_offset may be obtained, that is, a distance corresponding to one Hall scale.

In this embodiment of the present invention, after obtaining $L_1$ and $L_2$, the depth information obtaining apparatus can separately calculate the offset value $d_1$ of the first image and the offset value $d_2$ of the second image according to a relationship between an offset of a lens and an offset of an image. A calculation manner is specifically:

$$d_1 = L_1 * \frac{f_1 + \text{af\_offset}_1}{f_1}, \text{ and } d_2 = L_2 * \frac{f_2 + \text{af\_offset}_2}{f_2}.$$

In this embodiment of the present invention, the offsets of the first lens and the second lens are first obtained, and the offset value of the first image and the offset value of the second image are separately calculated according to the foregoing calculation formulas, then an offset difference between the two images are obtained. Therefore, correction of a distance between the target shooting object in the two images is more accurate, thereby improving accuracy of depth information.

S404. The depth information obtaining apparatus corrects the initial distance by using the offset difference.

S405. The depth information obtaining apparatus determines a depth of the target shooting object according to the corrected initial distance.

Figure 6:
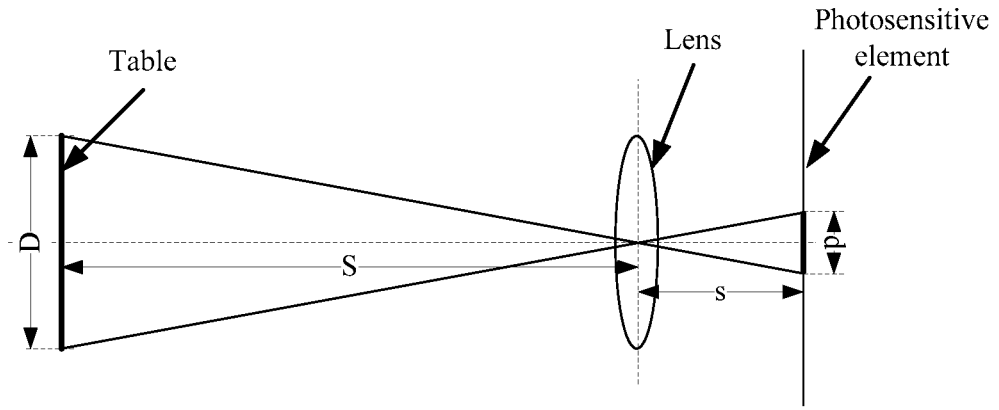
FIG. 6 is a schematic diagram of a focal length calibration method of a lens according to an embodiment of the present invention.

Optionally, to obtain more accurate depth information, the depth information obtaining apparatus may further calibrate focal lengths of the first lens and the second lens in advance. A specific manner may be as follows:

Also referring to FIG. 6, FIG. 6 is a schematic diagram of a focal length calibration method of a lens according to an embodiment of the present invention. As shown in FIG. 6, the depth information obtaining apparatus may control a lens of the camera to capture a table whose shooting depth is given (marked as S) and whose width is given (marked as D), and control the lens to move along a primary optical axis of the lens. When the lens is moved to a location at which an image has a highest contrast, the table is captured, and a width (marked as d) of the table on the photosensitive element may be obtained. In addition, the depth information obtaining apparatus may obtain a moving distance af_offset of the lens on the Z-axis relative to a start location of the lens. Assuming that a distance between the lens in this case and the photosensitive element is s, where s=f+af_offset, and the following relational expression may be obtained according to the imaging formula of a convex lens and an imaging principle of the lens in FIG. 6:

$$\begin{cases} \dfrac{d}{D} = \dfrac{s}{S} \\ \dfrac{1}{S} + \dfrac{1}{s} = \dfrac{1}{f} \end{cases}.$$

A focal length f of the lens may be calculated according to the foregoing relational expression, that is, $$f = \frac{d*S}{D+d}.$$

Therefore, to improve accuracy of depth obtaining, the depth information obtaining apparatus may further calculate a focal length of each camera in this manner.

In addition, in a production line, a difference between focal lengths of the two cameras may be managed and controlled. A difference between focal lengths, calibrated in the foregoing manner, of the two cameras is set to not greater than a preset focal length threshold. The preset focal length threshold may be 0.01. If the difference is greater than the preset focal length threshold, for example, $$\frac{|f_1 - f_2|}{f_1} > 0.01 \text{ or } \frac{|f_2 - f_1|}{f_2} > 0.01,$$

it indicates that focal length calibration fails this time, and a camera or a lens is replaced in the production line. If the difference between the focal lengths, calibrated in the foregoing manner, of the two cameras is less than the preset focal length threshold, it indicates that focal length calibration succeeds, and the depth information obtaining apparatus may calculate the depth of the target shooting object in the image by using a calibrated focal length.

S406. The depth information obtaining apparatus receives an instruction for focusing on the target shooting object.

In this embodiment of the present invention, the depth information obtaining apparatus may obtain a depth of each shooting object in the foregoing manner of obtaining the depth of the target shooting object Mobile phone photographing is used as an example. When a user needs to perform focusing on a target shooting object, after the user taps the target shooting object on an image preview screen of a mobile phone, the depth information obtaining apparatus may receive an instruction for focusing on the target shooting object. That is, the focusing instruction received by the depth information obtaining apparatus may be triggered by the user, or may be obtained by means of image analysis. This is not limited in this embodiment of the present invention.

For example, when the mobile phone starts a portrait mode for photographing, after obtaining a depth of each shooting object in a current scenario, the mobile phone may automatically identify that the target shooting object is a person, and an instruction for focusing on the person in the current scenario may be generated. If the user wants to focus on a plant in the background, the user may tap the plant on the image preview screen of the mobile phone, the depth information obtaining apparatus receives an instruction for focusing on the plant.

S407. In response to the focusing instruction, the depth information obtaining apparatus obtains a first moving distance that is of the first lens and that is corresponding to the depth, and obtains a second moving distance that is of the second lens and that is corresponding to the depth.

In this embodiment of the present invention, after receiving the focusing instruction, the depth information obtaining apparatus may calculate, according to the obtained depth Depth of the target shooting object, the first moving distance af_offset$_1$' of the first lens on the Z-axis relative to the first start location. Similarly, the depth information obtaining apparatus may obtain the second moving distance af_offset$_2$' of the second lens on the Z-axis relative to the second start location.

Specifically, with reference to the schematic diagram shown in FIG. 6, the depth Depth of the target shooting object is S in FIG. 6, and $f_1$+af_offset$_1$' is s in FIG. 6. Therefore, during calculation of the first moving distance af_offset$_1$', an expression for the depth Depth and an expression for s are substituted into an imaging formula, and the first moving distance af_offset$_1$' may be specifically calculated as follows:

$$\text{af\_offset}_1' = \frac{f_1{}^*(f_1 + \text{af\_offset}_1)^*|D_0|}{(f_1 + \text{af\_offset}_1)^*|D_0| - f_1{}^*|d_0'|}.$$

Because $f_2$+af_offset$_2$' is s in FIG. 6, similarly, the second moving distance af_offset$_2$' may be obtained as follows:

$$\text{af\_offset}_2' = \frac{f_2{}^*(f_2 + \text{af\_offset}_2)^*|D_0|}{(f_2 + \text{af\_offset}_2)^*|D_0| - f_2{}^*|d_0'|}.$$

S408. The depth information obtaining apparatus determines a focus location of the first lens according to the first moving distance, determines a focus location of the second lens according to the second moving distance, and controls the first lens and the second lens to move to respective focus locations.

In this embodiment of the present invention, when focusing needs to be performed on the target shooting object, after determining the first moving distance af_offset$_1$' of the first lens and the second moving distance af_offset$_2$' of the second lens, the depth information obtaining apparatus may determine, according to the first moving distance af_offset$_1$', the focus location at which the first lens performs focusing on the target shooting object; determine, according to the second moving distance af_offset$_2$', the focus location at which the second lens performs focusing on the target shooting object, and control the first lens and the second lens to move to respective focus locations, to implement focusing on the target shooting object.

Further, when the first lens and the second lens perform focusing on the target shooting object, the depth information obtaining apparatus may further blur another shooting object according to a difference between a depth of the another shooting object and the depth of the target shooting object. Specifically, the depth information obtaining apparatus blurs the another shooting object that is different from the target shooting object (that is, a focus point) by using a blurring algorithm, a shooting object farther away from the target shooting object receives a higher degree of blurring, and a shooting object nearer by the target shooting object receives a lower degree of blurring.

It can be learned that, in the method shown in FIG. 4, the depth information obtaining apparatus may detect the first offset of the first lens on the XY-plane relative to the first start location and the second offset of the second lens on the XY-plane relative to the second start location, to determine the offset value of the first image and the offset value of the second image. In this way, the initial distance between the target shooting object in the first image and the target shooting object in the second image can be corrected more accurately, and the finally calculated depth of the target shooting object is more accurate. Further, according to the depth obtained in this embodiment of the present invention, when focusing is performed on the target shooting object, the depth of the target shooting object is relatively accurate. Therefore, focusing accuracy and a focusing speed of the target shooting object can be increased, and imaging quality of the image acquisition device can be improved.

Figure 7:
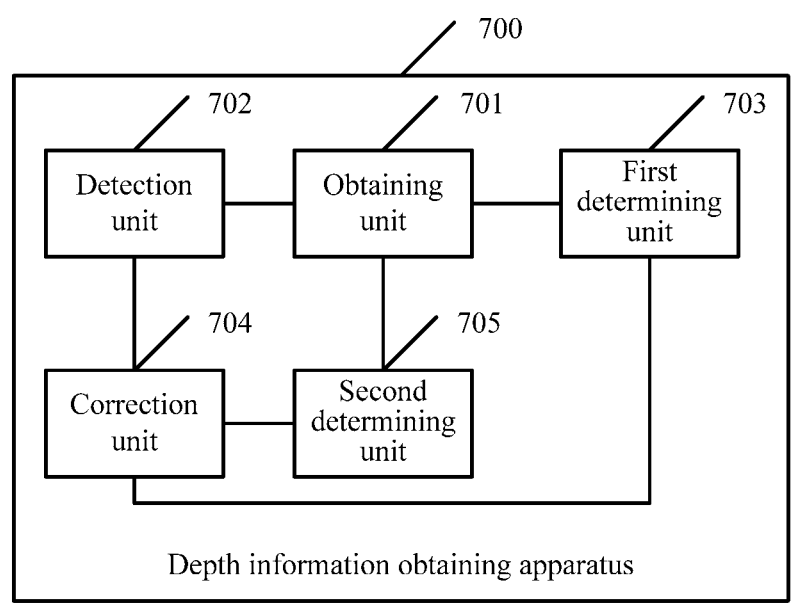
FIG. 7 is a schematic diagram of a depth information obtaining apparatus according to an embodiment of the present invention.

Based on the camera module shown in FIG. 1, an embodiment of the present invention discloses a depth information obtaining apparatus. Referring to FIG. 7, FIG. 7 is a schematic structural diagram of the depth information obtaining apparatus according to this embodiment of the present invention. The depth information obtaining apparatus 700 shown in FIG. 7 may be applied to an image acquisition device. The image acquisition device includes a first camera and a second camera. As shown in FIG. 7, the depth information obtaining apparatus 700 may include the following units:

an obtaining unit 701, configured to: when it is detected that the first camera and the second camera shake, obtain a first image of a target shooting object captured by the first camera and a second image of the target shooting object captured by the second camera, where the first camera and the second camera perform image acquisition at the same time; and a detection unit 702, configured to detect an initial distance between the target shooting object in the first image and the target shooting object in the second image;

a first determining unit 703, configured to determine an offset difference between the first image and the second image;

a correction unit 704, configured to correct the initial distance by using the offset difference; and a second determining unit 705, configured to determine a depth of the target shooting object according to the corrected initial distance.

Optionally, the initial distance may be a relative vector distance between the target shooting object in the first image and the target shooting object in the second image, and the offset difference is a relative offset difference between an offset value of the first image and an offset value of the second image. Alternatively, the initial distance may be a relative vector distance between the target shooting object in the second image and the target shooting object in the first image, and the offset difference is a relative offset difference between the offset value of the second image and the offset value of the first image. This is not limited in this embodiment of the present invention.

It can be learned that, if both the first camera and the second camera have an OIS function, or either of the cameras has an OIS function, when performing OIS, the depth information obtaining apparatus corrects the distance between the same shooting object in the two images respectively obtained by the two cameras, so that the image acquisition device finally obtains a relatively accurate depth of the object. This improves focusing accuracy of the cameras.

Figure 8:
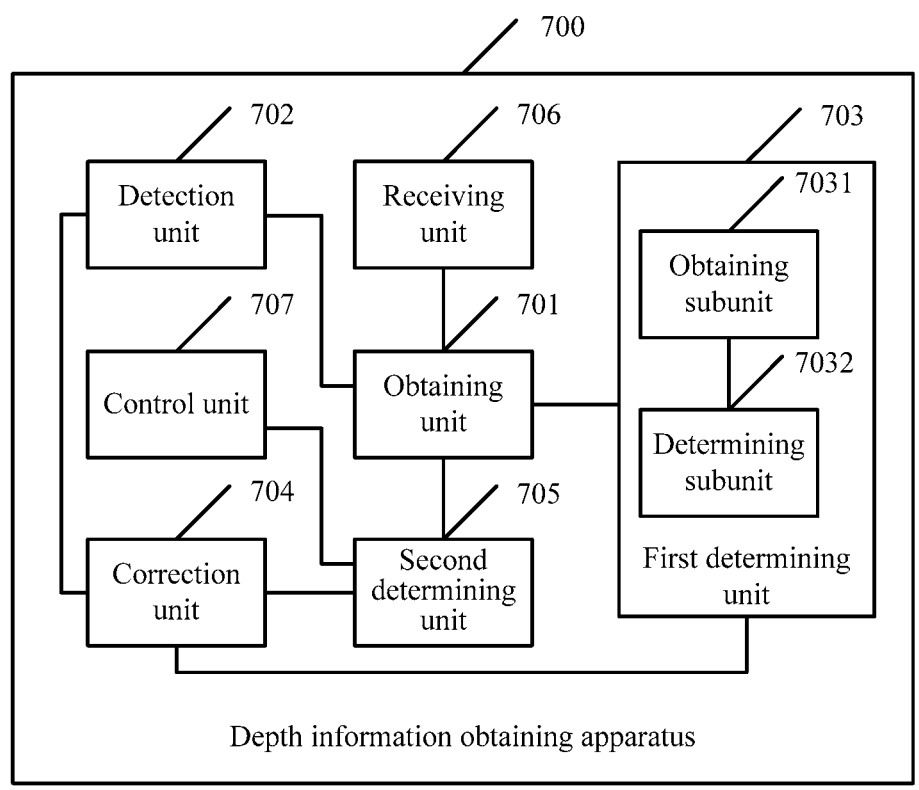
FIG. 8 is a schematic structural diagram of another depth information obtaining apparatus according to an embodiment of the present invention.

Also referring to FIG. 8, FIG. 8 is a schematic structural diagram of another depth information obtaining apparatus according to an embodiment of the present invention. The depth information obtaining apparatus 700 shown in FIG. 8 is obtained by means of optimization performed based on the depth information obtaining apparatus 700 shown in FIG. 7. As shown in FIG. 8, the depth information obtaining apparatus 700 may further include the following units:

A receiving unit 706 is configured to receive an instruction for focusing on the target shooting object.

The obtaining unit 701 is further configured to: in response to the focusing instruction, obtain a first moving distance that is of a first lens and that is corresponding to the depth, and obtain a second moving distance that is of a second lens and that is corresponding to the depth.

The second determining unit 705 is further configured to determine a focus location of the first lens according to the first moving distance, and determine a focus location of the second lens according to the second moving distance.

A control unit 707 is configured to control the first lens and the second lens to move to respective focus locations.

In this embodiment of the present invention, after obtaining the depth of the target shooting object, when needing to perform focusing on the target shooting object, the depth information obtaining apparatus 700 may obtain distances for which the lenses need to move and that are corresponding to the depth, determine focus locations of the lenses according to respective moving distances, and then move the lenses to the focus locations respectively corresponding to the distances. This can accurately and quickly implement focusing on the target shooting object.

In a feasible implementation, the first determining unit 703 may include an obtaining subunit 7031 and a determining subunit 7032.

The obtaining subunit 7031 is configured to: when the depth information obtaining apparatus 700 detects that the first camera and the second camera shake, obtain a first offset of the first lens and a second offset of the second lens.

The determining subunit 7032 is configured to determine an offset value of the first image according to the first offset, and determine an offset value of the second image according to the second offset, to obtain an offset difference between the offset value of the first image and the offset value of the second image.

It can be learned that, in the depth information obtaining apparatuses shown in the FIG. 7 and FIG. 8, when detecting that the cameras shake, the depth information obtaining apparatus may obtain the images captured by the first camera and the second camera, detect the initial distance between the target shooting object in the two images, correct the initial distance by using the offset difference between the first image and the second image, and finally substitute the corrected initial distance into a depth calculation formula to determine the depth of the target shooting object. According to this embodiment of the present invention, when the two cameras may both have an OIS function, or either of the cameras has an OIS function, the depth information obtaining apparatus may correct the distance between the same shooting object in the images obtained by the two cameras, so that depth information, finally obtained according to the corrected distance, of the shooting object is relatively accurate. This can accurately and quickly implement focusing on the shooting object.

Figure 9:
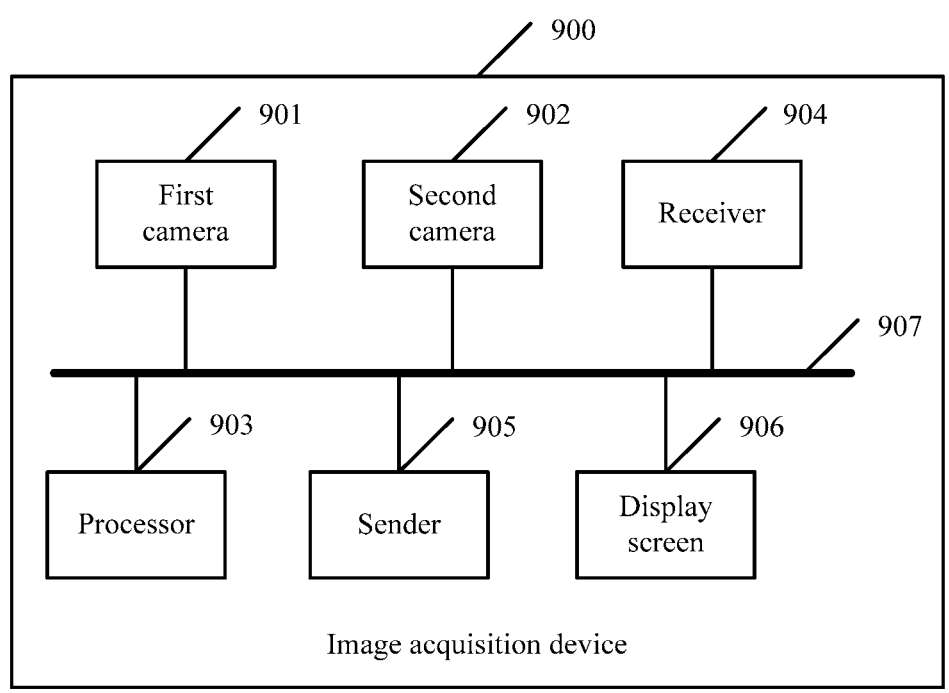
FIG. 9 is a schematic structural diagram of an image acquisition device according to an embodiment of the present invention.

Based on the camera module shown in FIG. 1, an embodiment of the present invention discloses an image acquisition device. Referring to FIG. 9, FIG. 9 is a schematic structural diagram of the image acquisition device according to this embodiment of the present invention. The image acquisition device 900 shown in FIG. 9 may include: a first camera 901, a second camera 902, at least one processor 903 such as a CPU, a receiver 904, a sender 905, a display screen 906, and a communications bus 907.

The sender 905 is configured to send various data signals such as an image to an external device.

The display screen 906 is configured to display images captured by the first camera 901 and the second camera 902. The display screen may be a touch display screen.

The communications bus 907 is configured to implement communication connections among these components such as the first camera 901, the second camera 902, the processor 903, the receiver 904, the sender 905, and the display screen 906.

The first camera 901 is configured to: when the image acquisition device 900 detects that the first camera and the second camera shake, capture a first image of a target shooting object.

The second camera 902 is configured to: when the image acquisition device 900 detects that the first camera and the second camera shake, capture a second image of the target shooting object, where the first camera and the second camera perform image acquisition at the same time.

The processor 903 is configured to obtain the first image and the second image, and detect an initial distance between the target shooting object in the first image and the target shooting object in the second image.

The processor 903 is further configured to determine an offset difference between the first image and the second image, and correct the initial distance by using the offset difference.

The processor 903 is further configured to determine a depth of the target shooting object according to the corrected initial distance.

Optionally, the initial distance may be a relative vector distance between the target shooting object in the first image and the target shooting object in the second image, and the offset difference is a relative offset difference between an offset value of the first image and an offset value of the second image. Alternatively, the initial distance may be a relative vector distance between the target shooting object in the second image and the target shooting object in the first image, and the offset difference is a relative offset difference between the offset value of the second image and the offset value of the first image. This is not limited in this embodiment of the present invention.

It can be learned that, if both the first camera and the second camera have an OIS function, or either of the cameras has an OIS function, when performing OIS, the image acquisition device 900 corrects the distance between the same shooting object in the two images respectively obtained by the two cameras, so that the image acquisition device finally obtains a relatively accurate depth of the object. This improves focusing accuracy of the cameras.

In a feasible implementation, a specific manner of determining the offset difference between the first image and the second image by the processor 903 may be:

when it is detected that the first camera and the second camera shake, obtaining a first offset of a first lens and a second offset of a second lens; and determining the offset value of the first image according to the first offset, and determining the offset value of the second image according to the second offset, to obtain an offset difference between the offset value of the first image and the offset value of the second image.

In another feasible implementation, the receiver 904 is configured to receive an instruction for focusing on the target shooting object.

The processor 903 is further configured to: in response to the focusing instruction, obtain a first moving distance that is of the first lens and that is corresponding to the depth, and obtain a second moving distance that is of the second lens and that is corresponding to the depth.

The processor 903 is further configured to determine a focus location of the first lens according to the first moving distance, and determine a focus location of the second lens according to the second moving distance.

The processor 903 is further configured to control the first lens and the second lens to move to respective focus locations.

In this embodiment of the present invention, after obtaining the depth of the target shooting object, when needing to perform focusing on the target shooting object, the image acquisition device 900 may obtain distances for which the lenses need to move and that are corresponding to the depth, determine focus locations of the lenses according to respective moving distances, and then move the lenses to the respective focus locations. This can accurately and quickly implement focusing on the target shooting object.

It can be learned that, in the image acquisition device shown in FIG. 9, the image acquisition device may include the first camera, the second camera, the processor, and the receiver. When it is detected that the first camera and the second camera shake, the first camera and the second camera may capture the first image and the second image of the target shooting object, respectively. The processor may obtain the first image and the second image, detect the initial distance between the target shooting object in the two images, correct the initial distance by using the offset difference between the first image and the second image, and finally substitute the corrected initial distance into a depth calculation formula, to determine the depth of the target shooting object. According to this embodiment of the present invention, when the two cameras may both have an OIS function, or either of the cameras has an OIS function, the image acquisition device may correct the distance between the same shooting object in the images obtained by the two cameras, so that depth information, finally obtained according to the corrected distance, of the shooting object is relatively accurate. This can accurately and quickly implement focusing on the shooting object.

It should be noted that, in the foregoing embodiments, the description of each embodiment has respective focuses. For a part that is not described in detail in an embodiment, reference may be made to related descriptions in other embodiments. In addition, a person skilled in the art should also appreciate that all the embodiments described in the specification are example embodiments, and the related actions and modules are not necessarily mandatory to the present invention.

A sequence of the steps of the methods in the embodiments of the present invention may be adjusted, and steps may be combined or removed according to an actual requirement.

Combination, division, and removing may be performed on the units of the depth information obtaining apparatus in the embodiments of the present invention according to an actual requirement.

The units of the embodiments of the present invention may be implemented by using a universal integrated circuit, such as a CPU (Central Processing Unit, central processing unit) or an ASIC (Application Specific Integrated Circuit, application-specific integrated circuit).

A person of ordinary skill in the art may understand that all or a part of the processes of the methods in the embodiments may be implemented by a computer program instructing relevant hardware. The program may be stored in a computer-readable storage medium. When the program runs, the processes of the methods in the embodiments are performed. The foregoing storage medium may be a magnetic disk, an optical disc, a read-only memory (Read-Only Memory, ROM), or a random access memory (Random Access Memory, RAM).

The depth information obtaining method and apparatus, and the image acquisition device that are disclosed in the embodiments of the present invention are described in detail in the foregoing. In this specification, specific examples are used to illustrate the principle and implementations of the present invention. The foregoing descriptions of the embodiments are merely intended to help understand the present invention and the core idea of the present invention. In addition, based on the idea of the present invention, a person of ordinary skill in the art can make modifications with respect to the specific implementations and the application scope. In conclusion, the content of this specification shall not be construed as a limitation to the present invention.

What is claimed is:

1. A depth information obtaining method, applied to an image acquisition device, wherein the image acquisition device comprises a first camera and a second camera, and the method comprises:

when it is detected that the first camera and the second camera shake, obtaining a first image of a target shooting object captured by the first camera and a second image of the target shooting object captured by the second camera, wherein the first camera and the second camera perform image acquisition at the same time;

detecting an initial distance between the target shooting object in the first image and the target shooting object in the second image, and determining an offset difference between the first image and the second image;

correcting the initial distance by using the offset difference; and determining a depth of the target shooting object according to the corrected initial distance.

2. The method according to claim 1, wherein the first camera comprises a first lens, the second camera comprises a second lens, and the determining an offset difference between the first image and the second image comprises:

when it is detected that the first camera and the second camera shake, obtaining a first offset of the first lens and a second offset of the second lens; and determining an offset value of the first image according to the first offset, and determining an offset value of the second image according to the second offset, to obtain an offset difference between the offset value of the first image and the offset value of the second image.

3. The method according to claim 2, wherein the initial distance is a relative distance between the target shooting object in the first image and the target shooting object in the second image, and the offset difference is a relative difference between the offset value of the first image and the offset value of the second image.

4. The method according to claim 3, wherein after the determining a depth of the target shooting object according to the corrected initial distance, the method further comprises:

receiving an instruction for focusing on the target shooting object;

in response to the focusing instruction, obtaining a first moving distance that is of the first lens and that is corresponding to the depth, and obtaining a second moving distance that is of the second lens and that is corresponding to the depth;

determining a focus location of the first lens according to the first moving distance, and determining a focus location of the second lens according to the second moving distance; and controlling the first lens and the second lens to move to respective focus locations.

5. A depth information obtaining apparatus, applied to an image acquisition device, wherein the image acquisition device comprises a first camera and a second camera, and the apparatus comprises:

an obtaining unit, configured to: when it is detected that the first camera and the second camera shake, obtain a first image of a target shooting object captured by the first camera and a second image of the target shooting object captured by the second camera, wherein the first camera and the second camera perform image acquisition at the same time;

a detection unit, configured to detect an initial distance between the target shooting object in the first image and the target shooting object in the second image;

a first determining unit, configured to determine an offset difference between the first image and the second image;

a correction unit, configured to correct the initial distance by using the offset difference; and a second determining unit, configured to determine a depth of the target shooting object according to the corrected initial distance.

6. The apparatus according to claim 5, wherein the first camera comprises a first lens, the second camera comprises a second lens, and the first determining unit comprises an obtaining subunit and a determining subunit, wherein the obtaining subunit is configured to: when it is detected that the first camera and the second camera shake, obtain a first offset of the first lens and a second offset of the second lens; and the determining subunit is configured to determine an offset value of the first image according to the first offset, and determine an offset value of the second image according to the second offset, to obtain an offset difference between the offset value of the first image and the offset value of the second image.

7. The method according to claim 6, wherein the initial distance is a relative distance between the target shooting object in the first image and the target shooting object in the second image, and the offset difference is a relative difference between the offset value of the first image and the offset value of the second image.

8. The apparatus according to claim 7, wherein the apparatus further comprises:

a receiving unit, configured to receive an instruction for focusing on the target shooting object, wherein the obtaining unit is further configured to: in response to the focusing instruction, obtain a first moving distance that is of the first lens and that is corresponding to the depth, and obtain a second moving distance that is of the second lens and that is corresponding to the depth; and the second determining unit is further configured to determine a focus location of the first lens according to the first moving distance, and determine a focus location of the second lens according to the second moving distance; and a control unit, configured to control the first lens and the second lens to move to respective focus locations.

9. An image acquisition device, wherein the image acquisition device comprises a first camera, a second camera, and a processor, wherein
 the first camera is configured to: when it is detected that the first camera and the second camera shake, capture a first image of a target shooting object;
 the second camera is configured to: when it is detected that the first camera and the second camera shake, capture a second image of the target shooting object, wherein the first camera and the second camera perform image acquisition at the same time;
 the processor is configured to obtain the first image and the second image, and detect an initial distance between the target shooting object in the first image and the target shooting object in the second image;
 the processor is further configured to determine an offset difference between the first image and the second image, and correct the initial distance by using the offset difference; and
 the processor is further configured to determine a depth of the target shooting object according to the corrected initial distance.

10. The image acquisition device according to claim 9, wherein the first camera comprises a first lens, the second camera comprises a second lens, and a specific manner of determining the offset difference between the first image and the second image by the processor is:
 when it is detected that the first camera and the second camera shake, obtaining a first offset of the first lens and a second offset of the second lens; and
 determining an offset value of the first image according to the first offset, and determining an offset value of the second image according to the second offset, to obtain an offset difference between the offset value of the first image and the offset value of the second image.

11. The image acquisition device according to claim 10, wherein the initial distance is a relative distance between the target shooting object in the first image and the target shooting object in the second image, and the offset difference is a relative difference between the offset value of the first image and the offset value of the second image.

12. The image acquisition device according to claim 11, wherein the image acquisition device further comprises:
 a receiver, configured to receive an instruction for focusing on the target shooting object, wherein
 the processor is further configured to: in response to the focusing instruction, obtain a first moving distance that is of the first lens and that is corresponding to the depth, and obtain a second moving distance that is of the second lens and that is corresponding to the depth;
 the processor is further configured to determine a focus location of the first lens according to the first moving distance, and determine a focus location of the second lens according to the second moving distance; and
 the processor is further configured to control the first lens and the second lens to move to respective focus locations.

* * * * *